United States Patent
Tsuchiya

(10) Patent No.: US 10,137,771 B2
(45) Date of Patent: Nov. 27, 2018

(54) CANISTER

(71) Applicant: AISAN KOGYO KABUSHIKI KAISHA, Obu-shi, Aichi-ken (JP)

(72) Inventor: Takumi Tsuchiya, Inazawa (JP)

(73) Assignee: AISAN KOGYO KABUSHIKI KAISHA, Obu-Shi, Aichi-Ken (JP)

(*) Notice: Subject to any disclaimer, the term of this patent is extended or adjusted under 35 U.S.C. 154(b) by 0 days.

(21) Appl. No.: 15/745,080

(22) PCT Filed: Jun. 16, 2016

(86) PCT No.: PCT/JP2016/067882
§ 371 (c)(1),
(2) Date: Jan. 15, 2018

(87) PCT Pub. No.: WO2017/010220
PCT Pub. Date: Jan. 19, 2017

(65) Prior Publication Data
US 2018/0208053 A1    Jul. 26, 2018

(30) Foreign Application Priority Data
Jul. 15, 2015    (JP) ................... 2015-141201

(51) Int. Cl.
*F02M 25/00* (2006.01)
*B60K 15/035* (2006.01)
(Continued)

(52) U.S. Cl.
CPC ....... *B60K 15/03504* (2013.01); *F02M 25/08* (2013.01); *F02M 25/0854* (2013.01);
(Continued)

(58) Field of Classification Search
CPC .................. F02M 25/0854; F02M 25/089
See application file for complete search history.

(56) References Cited

U.S. PATENT DOCUMENTS 4,058,380 A * 11/1977 King, II ............. F02M 25/0854
                                                123/519
4,877,001 A * 10/1989 Kenealy ............. F02M 25/0854
                                                123/519
(Continued)

FOREIGN PATENT DOCUMENTS

JP    S60203528 A    10/1985
JP    S63160361 U    10/1988
(Continued)

OTHER PUBLICATIONS

PCT/JP2016/067882 International Search Report and Written Opinion dated Jul. 19, 2016 (9 p.).

*Primary Examiner* — Hieu T Vo
*Assistant Examiner* — Sherman Manley
(74) *Attorney, Agent, or Firm* — Conley Rose, P.C.

(57) ABSTRACT

A canister includes a canister case. The canister case includes a tank port, a purge port, and an atmospheric port. An adsorbent (14) is disposed in the canister case. The canister case also includes a case body having a peripheral wall portion and an end wall portion, and a cover having an end wall portion closing the open end of the case body. The tank port and the purge port are formed to be arranged side-by-side on the end wall portion of the case body. The atmospheric port, a holding tube portion configured to receive an OBD module for communicating with the atmospheric port, and a mount piece configured to mount to a vehicle are formed on the end wall portion of the cover.

4 Claims, 5 Drawing Sheets

(51) Int. Cl.
  *F02M 25/08* (2006.01)
  *B01J 20/28* (2006.01)
  *B60K 15/01* (2006.01)
  *B60K 15/07* (2006.01)

(52) U.S. Cl.
  CPC ......... *B01J 20/28004* (2013.01); *B60K 15/01* (2013.01); *B60K 15/07* (2013.01); *F02M 25/089* (2013.01)

(56) References Cited

U.S. PATENT DOCUMENTS

| | | | |
|---|---|---|---|
| 5,453,118 A * | 9/1995 | Heiligman | B01D 53/02 123/519 |
| 5,501,198 A | 3/1996 | Koyama | |
| 5,676,116 A | 10/1997 | Kim | |
| 7,097,697 B2 * | 8/2006 | Nakamura | B01D 53/0431 123/519 |
| 7,527,044 B2 * | 5/2009 | Dunkle | F02M 25/0854 123/519 |
| 7,823,568 B1 * | 11/2010 | Lin | B01D 53/0415 123/518 |
| 8,151,768 B2 * | 4/2012 | Kaneda | F02M 25/0854 123/509 |
| 8,434,460 B2 * | 5/2013 | Lin | F02M 25/0854 123/519 |
| 9,683,526 B2 * | 6/2017 | Matsuura | F02M 25/0854 |
| 2001/0047723 A1 * | 12/2001 | Miura | B01D 53/0415 96/121 |
| 2008/0237283 A1 * | 10/2008 | Ichikawa | F02M 25/0854 224/401 |
| 2011/0120796 A1 * | 5/2011 | Kuramochi | B62J 37/00 180/219 |
| 2011/0308874 A1 * | 12/2011 | Tanaka | B60K 15/03504 180/219 |
| 2012/0247862 A1 * | 10/2012 | Nishimura | B62K 11/04 180/299 |
| 2016/0010599 A1 * | 1/2016 | Tsubone | F02M 25/0854 123/520 |
| 2017/0304766 A1 * | 10/2017 | Park | B01D 53/0415 |
| 2018/0038320 A1 * | 2/2018 | Waples | B60K 15/03504 |

FOREIGN PATENT DOCUMENTS

| | | |
|---|---|---|
| JP | H0275749 A | 3/1990 |
| JP | H0573254 U | 10/1993 |
| JP | H07217506 A | 8/1995 |
| JP | H0925855 A | 1/1997 |
| JP | 2009293438 A | 12/2009 |
| JP | 2010106712 A | 5/2010 |

* cited by examiner

CANISTER

CROSS-REFERENCE TO RELATED APPLICATIONS

The present application is a 35 U.S.C. § 371 national stage application of PCT Application No. PCT/JP2016/067882 filed Jun. 16, 2016, which claims priority to Japanese Patent Application No. 2015-141201 filed Jul. 15, 2015, both of which are incorporated by reference herein in their entireties for all purposes.

STATEMENT REGARDING FEDERALLY SPONSORED RESEARCH OR DEVELOPMENT

Not applicable.

BACKGROUND

The present disclosure relates to a canister.

A conventional canister is disclosed, for example, in JP-A-2010-106712. The canister disclosed in JP-A-2010-106712 is provided with a canister case having a tank port communicating with a fuel tank, a purge port communicating with an intake passage of an internal combustion engine, an atmospheric port opened to the atmosphere, and an adsorbent disposed in the canister case for adsorbing and desorbing fuel vapor from the tank port. The canister case includes a case body having a tubular peripheral wall portion extending in an axial direction and an end wall portion closing one of open ends of the peripheral wall portion, and a cover having an end wall portion closing the open end of the case body. On the end wall portion of the case body, there are formed the tank port, the purge port, the atmospheric port, and an accessory component mount portion capable of mounting thereto an accessory component for communication with the atmospheric port.

SUMMARY

In one feature according to the present disclosure, a canister includes a canister case including a tank port communicating with a fuel tank, a purge port communicating with an intake passage of an internal combustion engine of a vehicle, and an atmospheric port opened to the atmosphere, and an adsorbent filled into the canister case and configured to adsorb and desorb fuel vapor led from the tank port. The canister case includes a case body having a tubular peripheral wall portion extending in an axial direction and an end wall portion closing one of open ends of the peripheral wall portion, and a cover having an end wall portion closing the other of the open ends of the peripheral wall portion of the case body. Two of the tank port, the purge port and the atmospheric port are formed to be arranged side-by-side on one of the end wall portion of the case body and the end wall portion of the cover. The remaining one of the ports, an accessory component mount portion configured couple to an accessory component for communication with the remaining one of the ports, and a vehicle mount portion configured to be mounted to the vehicle are formed on the other of the end wall portion of the case body and the end wall portion of the cover.

With this feature, two ports are formed to be arranged side-by-side on one of the end wall portion of the case body and the end wall portion of the cover, and the accessory component mount portion including one port is formed on the other of the end wall portion of the case body and the end wall portion of the cover, and therefore, it is possible to reduce the size in the port arrangement direction of the canister case having the accessory component mount portion. Further, the vehicle mount portion of the other end wall portion having the accessory component mount portion formed thereon is mounted to the vehicle, so that the accessory component can be supported in stable.

DETAILED DESCRIPTION

According to the canister disclosed in JP-A-2010-106712, the tank port, the purge port, and the accessory component mount portion including the atmospheric port are arranged in a row at the end wall portion of the case body of the canister case. Therefore, there has been a problem in that the size of the canister case increases in the arrangement direction of the tank port, the purge port and the accessory component mount portion (hereinafter called a "port arrangement direction"). Accordingly, there is a need in the art for providing a canister that can decrease the size in the port arrangement direction of a canister case having an accessory component mount portion.

Figure 1:
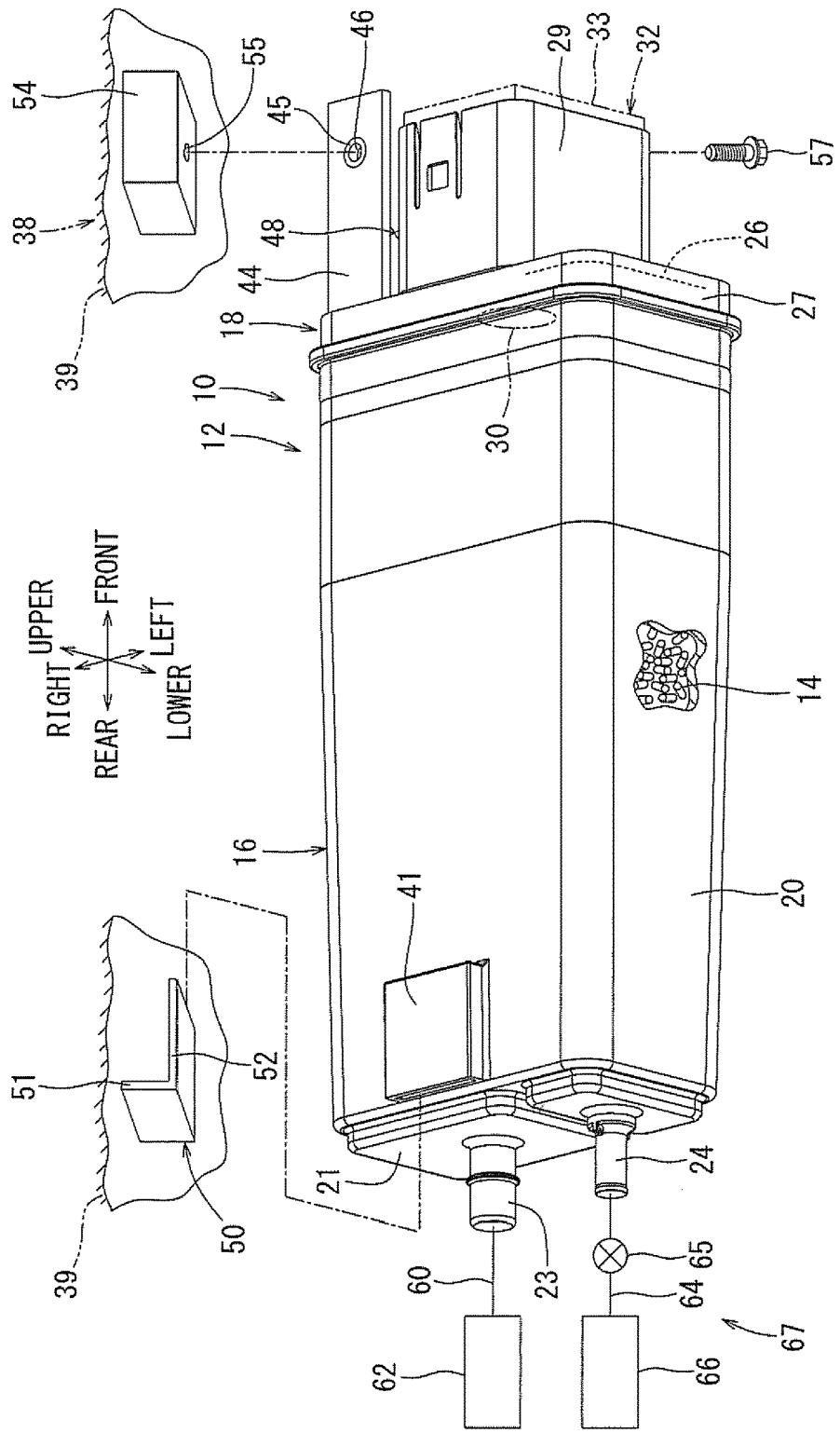
FIG. 1 is a perspective, partial broken away view of an embodiment of a canister in accordance with the principles described herein.
Figure 2:
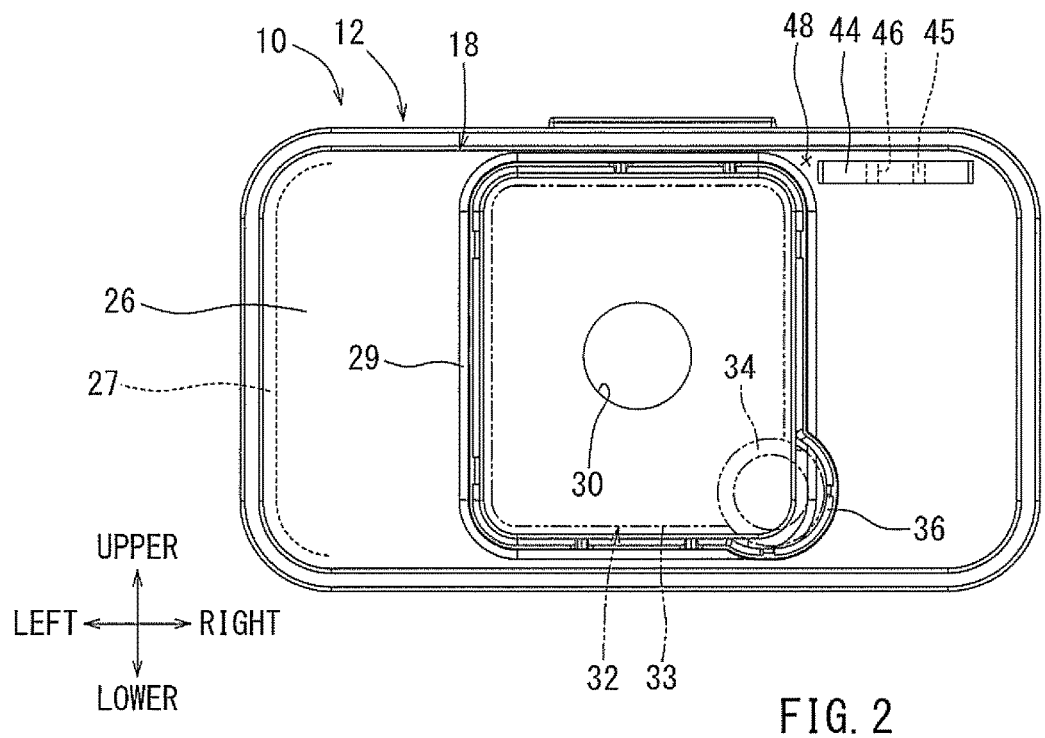
FIG. 2 is a front view of the canister of FIG. 1.
Figure 3:
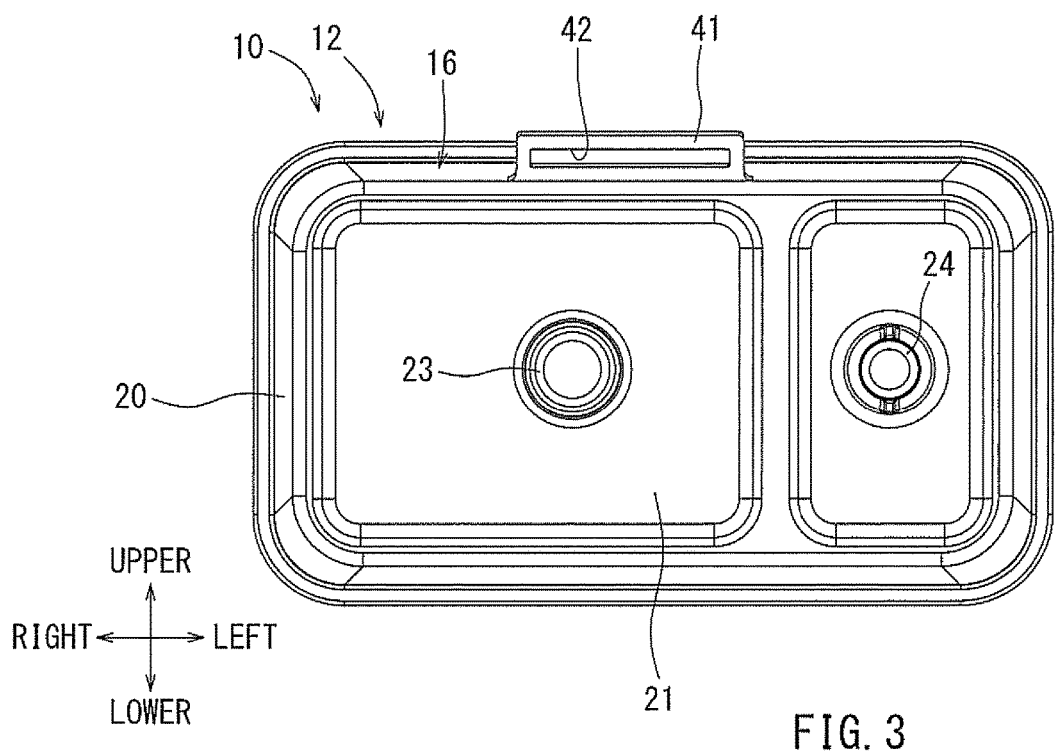
FIG. 3 is a backside view of the canister of FIG. 1.

An embodiment for carrying out the present disclosure will be described with reference to the drawings. FIG. 1 is a perspective view illustrating a canister 10 with a part broken away, FIG. 2 is a front view of the same, and FIG. 3 is a backside view of the same. Although the directions for the canister 10 are determined as indicated by arrows in the drawings, the arrows are not intended to specify the arrangement direction of the canister. Further, in this embodiment, the up-to-down direction of the canister 10 corresponds to a vertical direction in a state where the canister 10 has been installed on a vehicle, such as an automobile, having an internal combustion engine, a so-called engine, installed thereon.

As shown in FIG. 1, the canister 10 is provided with a canister case 12. The canister case 12 is formed to have a horizontally elongated rectangular parallelepiped box shape extending in the front-to-rear direction, and its length in the up-to-down direction is set to be shorter than the length in the front-to-rear direction and that in the left-to-right direction. An adsorbent 14, such as granular activated carbon, for adsorbing and desorbing fuel vapor is filled into the canister case 12. The canister case 12 includes a case body 16 molded from resin, and a cover 18 also molded from resin. The cover 18 is joined to the open end of the case body 16 by way of welding, etc. after the adsorbent 14 has been filled into the case body 16. The cover 18 closes the open end on the front side of the case body 16.

The case body 16 includes a peripheral wall portion 20 having a horizontally elongated parallelepiped shape extending in the axial direction, i.e., the front-to-rear direction, and a horizontally elongated rectangular end wall portion 21 closing the rear end of the peripheral wall portion 20 (hereinafter called a "rear end wall portion"). As shown in FIG. 3, a tank port 23 and a purge port 24 each communicating between the inside and the outside of the case body 16 are arranged side-by-side on the rear end wall portion 21. The tank port 23 and the purge port 24 are each formed to have a shape like a pipe protruding rearward from the rear end wall portion 21. The rear end wall portion 21 corresponds to "one of the end wall portions" in this description.

Figure 4:
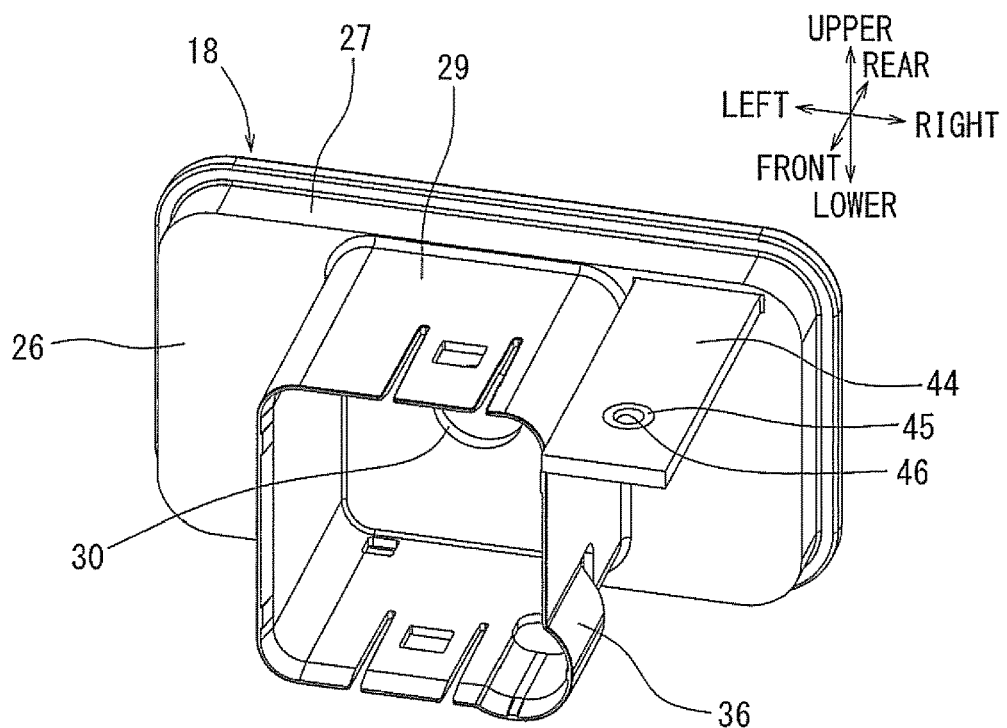
FIG. 4 is a perspective view of the cover of the canister of FIG. 1.
Figure 5:
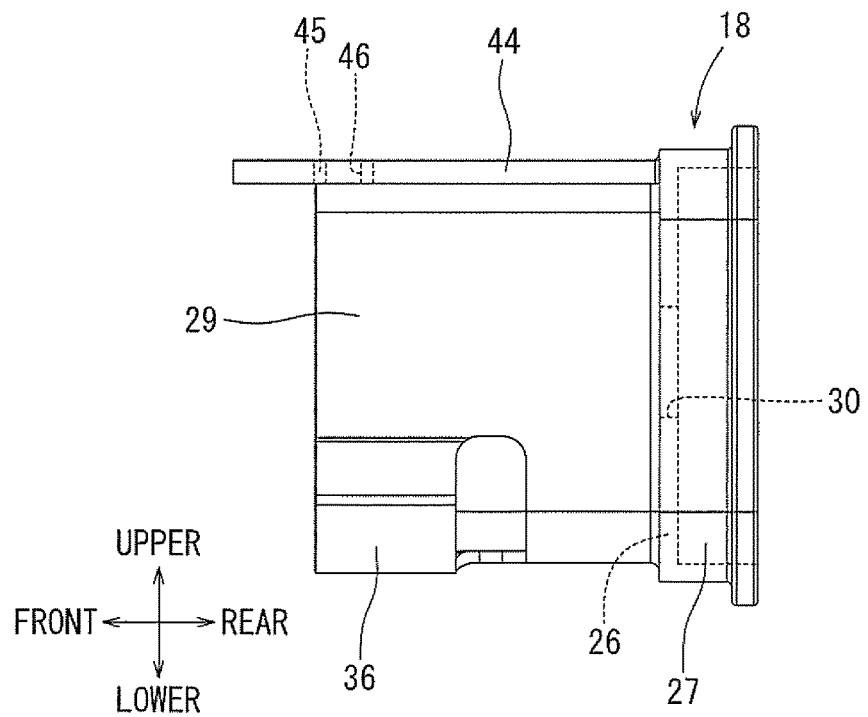
FIG. 5 is a right side view of the cover of the canister of FIG. 1.
Figure 6:
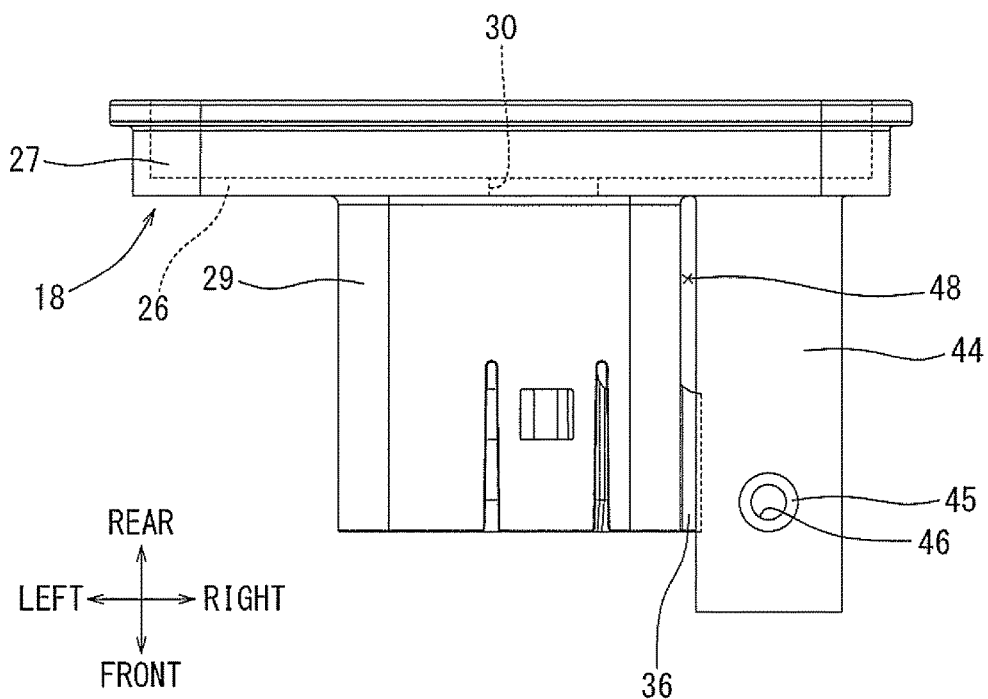
FIG. 6 is a plan view of the cover of the canister of FIG. 1.

FIG. 4 is a perspective view illustrating the cover 18, FIG. 5 is a right side view illustrating the same, and FIG. 6 is a plan view illustrating the same. As shown in FIGS. 4 to 6, the cover 18 includes a horizontally elongated rectangular end wall portion 26 (hereinafter called a "front end wall portion"), and a rectangular loop-shaped joint wall portion 27 formed on the outer peripheral portion on the rear surface side of the front end wall portion 26. A rectangular parallelepiped holding tube portion 29 is formed on the front surface of the front end wall portion 26. The holding tube portion 29 is formed on the intermediate portion with respect to the left-to-right direction of the front end wall portion 26 so as to have an axis extending in the front-to-rear direction. Thus, as shown in FIG. 1, the axial direction of the holding tube portion 29 is parallel to the axial direction of the peripheral wall portion 20 of the canister case 12. As shown in FIG. 2, an atmospheric port 30 communicating between the inside and the outside of the cover 18 is formed on the front end wall portion 26 at a position within the holding tube portion 29. The joint wall portion 27 is formed such that it can be joined to the open end of the peripheral wall portion 20 of the case body 16 by way of welding, etc. The front end wall portion 26 corresponds to "the other end wall portion" in this description.

As shown in FIGS. 1 and 2, the inside of the holding tube portion 29 is formed to receive therein an OBD (On-Board Diagnostics) module 32 by way of snap-fitting. A housing 33 of the OBD module 32 is formed to have a rectangular parallelepiped shape and is formed to fit into the holding tube portion 29 along the axial direction and to engage therewith by way of snap-fitting. As the OBD module 32 is fitted into the holding tube portion 29, the OBD module 32 is brought to communicate with the atmospheric port 30. The housing 33 is provided with an atmosphere opening port 34 communicating with the atmosphere. The atmosphere opening port 34 extends in the axial direction, i.e., the front-to-rear direction, at the right lower portion of the housing 33. As shown in FIGS. 2 and 4, at the right lower portion of the holding tube portion 29, there is formed a surrounding wall portion 36 having an arc-shape in cross section to surround the right lower portion of the atmosphere open port 34 of the housing 33.

The OBD module 32 is a component called a key-off pump used for a failure diagnosis that is performed when the vehicle engine is stopped, and the OBD module 32 includes a pump, an electromagnetic valve, an electric connector, etc. (not show) that are modularized. The OBD module 32 is drive-controlled by an engine control device (not shown) based on the off operation of the engine, whereby the OBD module 32 reduces or increases the pressure within a fuel vapor passage for detecting the presence of leakage based on a variation in the pressure after that. The OBD module 32 corresponds to an "accessory component" in this description. The holding tube portion 29 corresponds to an "accessory component mount portion" in this description.

Figure 7:
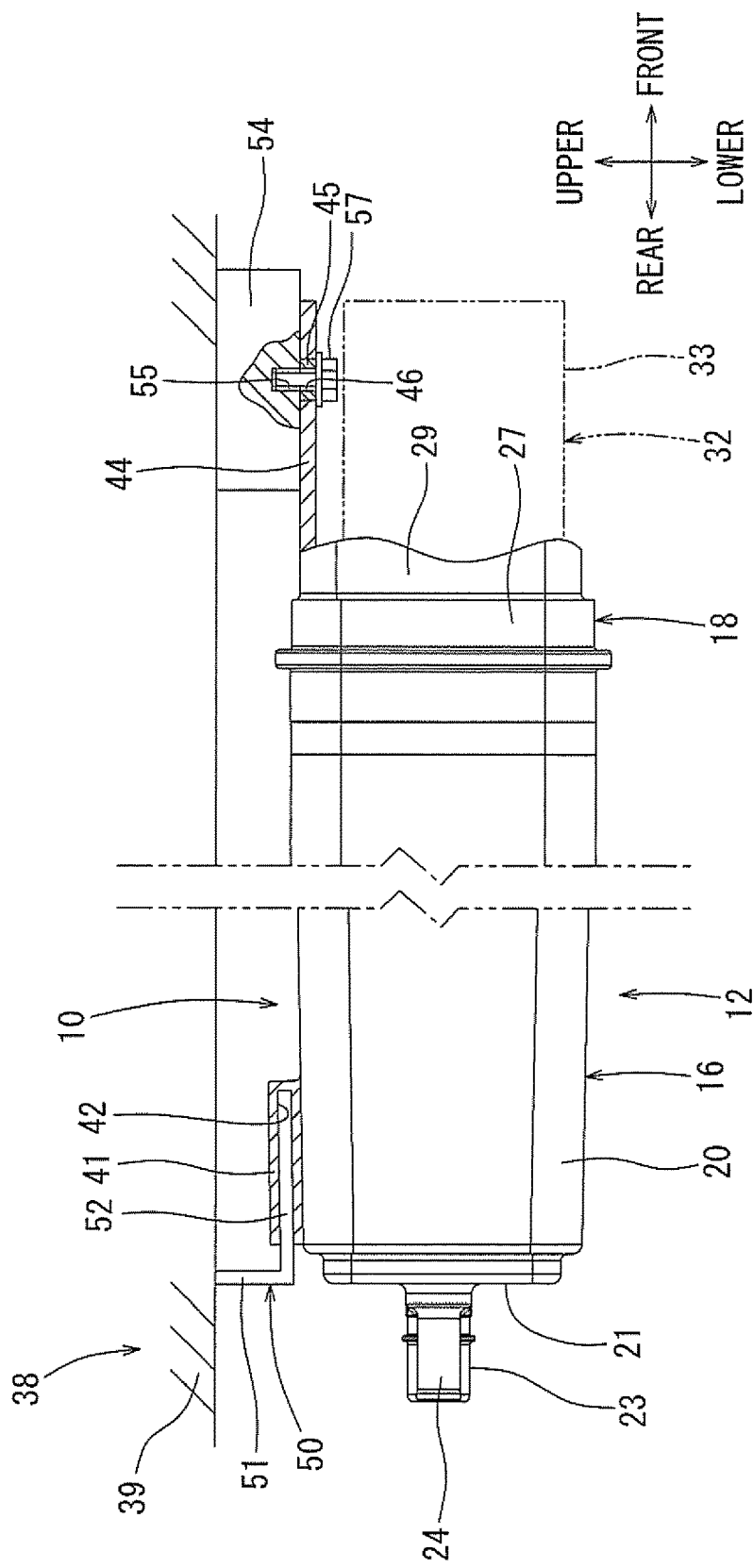
FIG. 7 is a side, partial broken away view of the canister of FIG. 1 being mounted to a vehicle.

Next, a mounting structure for mounting the canister 10 to the vehicle will now be described. FIG. 7 is a side view with a part broken away illustrating the canister 10 mounted to the vehicle. A shown in FIG. 7, the canister 10 is mounted to a lower side of a stationary member, such as a floor panel 39 of a vehicle body of a vehicle 38. As shown in FIG. 3, a horizontally elongated rectangular tubular engaging portion 41 extending in the front-to-rear direction and flattened in the up-to-down direction is formed on the upper surface of the peripheral wall portion 20 at the rear end portion of the case body 16. The engaging portion 41 includes an engaging hole 42 having a closed front end and a rear opening. It may be possible that the engaging hole 42 has an open front end.

As shown in FIGS. 2 and 4, a mounting piece 44 with a band-plate shape is formed on the right upper portion of the front end wall portion 26 of the cover 18. The mounting piece 44 is formed such that it extends in the axial direction, i.e., the front-to-rear direction, of the peripheral wall portion 20 of the canister case 12 in the state where its thickness direction is oriented in the up-to-down direction. Thus, as shown in FIG. 1, the axial direction of the mounting piece 44 is parallel to the axial direction of the peripheral wall portion 20 of the canister case 12. The mounting piece 44 is formed to be flexurally deformable in the thickness direction, i.e., the up-to-down direction. As shown in FIG. 6, a metal cylindrical tubular collar 45 is disposed at the front end portion of the mounting piece 44 by way of insertion molding or press-fitting, etc. A hollow space within the collar 45 is formed as a bolt insertion hole 46 penetrating the collar 45 in the up-to-down direction. The holding tube portion 29 and the mounting piece 44 are arranged such that they do not contact with each other, in other words, they are separated from each other. Therefore, as shown in FIGS. 2 and 6, between the holding tube portion 29 and the mounting piece 44, there is formed a slit-like gap 48 extending in the front-to-rear direction. The mounting piece 44 corresponds to a "vehicle mount portion" in this description.

As shown in FIG. 7, a hook member 50 for engaging the engaging portion 41 of the case body 16 of the canister case 12 is disposed on the lower surface side of the floor panel 39. As shown in FIG. 1, the hook member 50 includes a suspending piece portion 51 extending downward from the floor panel 39 and a hook portion 52 extending forward from the lower end portion of the suspending piece portion 51, so that the hook member 50 is formed to have an L-shape in cross section. The hook member 50 is formed to have a predetermined width in the left-to-right direction. The hook portion 52 is formed to fit into the engaging opening 42 of the engaging portion 41 without producing a substantial gap.

As shown in FIG. 1, a fastening member 54 for engaging the mounting piece 44 of the cover 18 of the canister case 12 is disposed on the lower surface side of the floor panel 39 at a position on the front side of the hook member 50. The fastening member 54 is formed to have a rectangular parallelepiped shape. A threaded hole 55 is formed in the lower surface of the fastening member 54. The threaded hole 55 is positioned to be coaxial with the bolt insertion hole 46 of the mounting piece 44, so that a bolt 57 can be threadably engaged with the threaded hole 55 via the insertion hole 46. The bolt 57 corresponds to a "bolt disposed at a vehicle" in this description.

A process for mounting the canister 10 to the vehicle 38 will now be described with reference to FIG. 7. First, the engaging portion 41 of the canister case 12 is engaged with the hook portion 52 of the hook member 50. Next, the bolt 57 is inserted into the bolt insertion hole 46 of the mounting piece 44 and is tightened into the threaded hole 55 of the fastening member 54. In this way, the mounting operation of the canister 10 to the vehicle 38 is completed. The hook member 50 and the engaging portion 41 constitute an engaging means. The fastening member 54 and the mounting piece 44 constitute a fastening means.

As shown in FIG. 1, the tank port 23 of the canister 10 communicates with an upper gaseous layer within a fuel tank 62 via a fuel vapor passage 60. The purge port 24 communicates with an intake passage 66 of the engine via a purge passage 64. A purge valve 65 of an electromagnetic type is disposed in the purge passage 64. The purge valve 65 is controlled for opening and closing by the engine control device. The OBD module 32 is mounted to the holding tube portion 29. The mounting operation of the OBD module 32 to the holding tube portion 29 can be performed before or after mounting the canister 10 to the floor panel 39. The canister 10, the OBD module 32, the fuel vapor passage 60, the purge passage 64 and the purge valve 65, etc. constitute a fuel vapor processing apparatus 67

With the fuel vapor processing apparatus 67, during stopping of the engine, fuel vapor within the fuel tank 62 is introduced into the canister case 12 of the canister 10 via the fuel vapor passage 60 so as to be adsorbed by the adsorbent 14. During stopping of the engine, the purge valve 65 and the electromagnetic valve of the OBD module 32 are closed.

During the operation of the engine, if the purge valve 65 and the electromagnetic valve of the OBD module 32 are opened, the external air (atmospheric air) flows into the canister case 12 via the OBD module 32, so that fuel vapor adsorbed by the adsorbent 14 is purged into the intake passage 66 via the purge passage 64. Further, as the OBD module 32 is drive-controlled based on the off operation of the engine, the presence of leakage from the fuel vapor processing apparatus 67 is detected.

According to the canister 10 described above, the tank port 23 and the purge port 24 are formed to be arranged side-by-side on the rear end wall portion 21 of the case body 16, while the holding tube portion 29 including the atmospheric port 30 is formed on the front end wall portion 26 of the cover 18. With this arrangement, in comparison with the conventional construction, it is possible to reduce the size of the canister case 12 having the holding tube portion 29 in the port arrangement direction, i.e., the left-to-right direction. Further, by mounting to the vehicle 38 the mounting piece 44 of the front end wall portion 26 having the holding tube portion 29 formed thereon of the cover 18, it is possible to support the OBD module 32 in a stable manner.

The holding tube portion 29 and the mounting piece 44 are arranged on the front end wall portion 26 in a state where they do not contact each other. Therefore, travelling vibrations of the vehicle 38 are hard to be transmitted from the mounting piece 44 to the holding tube portion 29, and hence, it is possible to prohibit generation of distortion of the holding tube portion 29 by the travelling vibrations. This is effective for prohibiting falling of the OBD module 32, reduction in the strength of the front end wall portion 26, etc., which may be caused by the distortion of the holding tube portion 29.

The holding tube portion 29 and the mounting piece 44 are formed on the front end wall portion 26 to extend in the same direction as the axial direction of the canister case 12. Therefore, the holding tube portion 29 and the mounting piece 44 can be easily molded by removing a molding die in the axial direction during a resin molding process for the cover 18 having the front end wall portion 26.

The mounting piece 44 is formed to have a band-plate shape flexurally deformable in the thickness direction, and the bolt insertion hole 46 for inserting the bolt 57 provided on the vehicle 38 penetrates through the tip end portion of the mounting piece 44 in the thickness direction. Therefore, a dimensional error between the bolt 57 provided on the vehicle 38 and the bolt insertion hole 46 can be absorbed by the flexural deformation of the mounting piece 44, so that a load applied to the side of the cover 18 can be reduced.

The present disclosure may not be limited to the above embodiment and can be modified without departing from the gist of the present disclosure. For example, the canister 10 may be mounted to any other stationary side member other than the floor panel 39 of the vehicle 38. It may be possible to form the tank port 23 and the purge port 24 on the front end wall portion 26, with the atmospheric port 30, the holding tube portion 29 and the mounting piece 44 formed on the rear end wall portion 21 of the case body 16. The tank port 23 or the purge port 24 of the rear end wall portion 21 of the case body 16 may be replaced with the atmospheric port 30. The atmospheric port 30 of the front end wall portion 26 of the cover 18 may be replaced with the tank port 23 or the purge port 24. The accessory device may be a different component from the OBD module 32. The holding tube portion 29 and the mounting piece 44 of the front end wall portion 26 may be arranged in a contact state, i.e., a connected state, with each other. The mounting piece 44 may be formed on the holding tube portion 29 without being joined to the front end wall portion 26. The bolt 57 may be tightened into the mounting piece 44 via a stationary side member of the vehicle body of the vehicle 38. It may be possible to arrange the hook member 50 at the canister case 12 and to arrange the engaging portion 41 at the floor panel 39. It may be possible to arrange a stud bolt at the floor panel 39 and to tighten a nut on the stud bolt with the stud bolt inserted into the bolt insertion hole 46 of the mounting piece 44. In this case, the stud bolt corresponds to the "bolt disposed at a vehicle" in this description. It may be possible to arrange the tightening means on the side of the case body 16 and to arrange the engaging means on the side of the cover 18. In this case, the engaging portion 41 or the hook member 50 of the engaging means corresponds to the "vehicle mount portion" in this description.

The invention claimed is:

1. A canister comprising:
   a canister case including a tank port configured to communicate with a fuel tank, a purge port configured to communicate with an intake passage of an internal combustion engine of a vehicle, and an atmospheric port opened to the atmosphere; and
   an adsorbent disposed in the canister case and configured to adsorb and desorb fuel vapor from the tank port;
   wherein:
   the canister case having a longitudinal axis and comprising:
      a case body having a tubular peripheral wall portion extending in an axial direction and an end wall portion closing a first end of the peripheral wall portion; and
      a cover having an end wall portion closing a second end of the peripheral wall portion of the case body;
   two of the tank port, the purge port and the atmospheric port are positioned side-by-side on the end wall portion of the case body or the end wall portion of the cover; and
   the remaining one of the tank port, the purge port and the atmospheric port, an accessory component mount portion configured to couple to an accessory component for communication with the remaining one of the tank port, the purge port and the atmospheric port, and a vehicle mount portion confiqured to be mounted to the vehicle are formed on the other of the end wall portion of the case body and the end wall portion of the cover.

2. The canister according to claim 1, wherein: the accessory component mount portion is spaced from the vehicle mount portion.

3. The canister according to claim 2, wherein: the accessory component mount portion and the vehicle mount portion extend in the axial direction of the canister case.

4. The canister according to claim 3, wherein: the vehicle mount portion has a band-plate shape configured to deformably flex in a thickness direction; and a tip end portion of the vehicle mount portion includes a through-hole extending therethrough in the thickness direction and configured to receive a bolt for fixing the vehicle mount portion to the vehicle.

* * * * *